US012358717B2

(12) United States Patent
Liao et al.

(10) Patent No.: US 12,358,717 B2
(45) Date of Patent: Jul. 15, 2025

(54) CLUTCH DEVICE AND INDUCTION BIN

(71) Applicant: Jiangmen Jinlong High Technology Industrial Co., Ltd., Guangdong (CN)

(72) Inventors: Jinsheng Liao, Guangdong (CN); Baiyao Lin, Guangdong (CN)

(73) Assignee: Jiangmen Jinlong High Technology Industrial Co., Ltd., Jiangmen (CN)

( * ) Notice: Subject to any disclaimer, the term of this patent is extended or adjusted under 35 U.S.C. 154(b) by 377 days.

(21) Appl. No.: 18/062,631

(22) Filed: Dec. 7, 2022

(65) Prior Publication Data

US 2024/0140701 A1 May 2, 2024

(30) Foreign Application Priority Data

Nov. 2, 2022 (CN) ......................... 202222917817.8

(51) Int. Cl.
*B65F 1/16* (2006.01)

(52) U.S. Cl.
CPC .................................. *B65F 1/1638* (2013.01)

(58) Field of Classification Search
CPC ..................................................... B65F 1/1638
USPC .................................................. 220/211, 832
See application file for complete search history.

(56) References Cited

U.S. PATENT DOCUMENTS 10,597,228 B1 * 3/2020 Yao ....................... B65F 1/1646
2009/0194532 A1 * 8/2009 Yang ..................... B65F 1/1638 220/211
2015/0259140 A1 * 9/2015 Yang ..................... B65F 1/1646 220/211

FOREIGN PATENT DOCUMENTS

EP 2636611 A1 * 9/2013 ................ B65F 1/04
JP 05132070 A * 5/1993

* cited by examiner

*Primary Examiner* — Anthony D Stashick
*Assistant Examiner* — Niki M Eloshway
(74) *Attorney, Agent, or Firm* — Whiteford, Taylor & Preston, LLP; Peter J. Davis

(57) ABSTRACT

A clutch device and an induction bin are disclosed. The clutch device includes a transmission assembly and a reset assembly. The transmission assembly includes a first connector and a second connector, the first connector is connected to the second connector, the first connector is provided with a bump on a side of the first connector close to the second connector, the second connector is provided with a groove on a side of the second connector close to the first connector, and the second connector is movable in an axial direction so that the bump is capable of being clamped in or slid out of the groove. The reset assembly includes an elastic element, which is configured to drive the second connector to move towards the first connector.

16 Claims, 6 Drawing Sheets

CLUTCH DEVICE AND INDUCTION BIN

CROSS-REFERENCE TO RELATED APPLICATION

This application is filed on the basis of Chinese patent application No. 2022229178178 filed Nov. 2, 2022, and claims priority of the Chinese patent application, the entire contents of which are incorporated herein by reference.

TECHNICAL FIELD

The disclosure relates to the technical field of trash bins, in particular to a clutch device and an induction bin.

BACKGROUND

The existing trash bin is provided with an electric flip mechanism, which can sense the movement of a user, and then drive the lid of the trash bin to open and close automatically by a motor. The existing electric flip mechanism mainly connects an output shaft of the motor directly to the lid. However, the lid of the trash bin is easily unable to be opened and closed when suffering an external force, or the user is prone to force the lid to be opened or closed by mistake, resulting in additional loads on the motor, which makes the motor easily damaged due to overload, and reduces the service life of the trash bin.

SUMMARY

The disclosure aims to solve one of the technical problems in the related art at least to a certain extent. Therefore, the disclosure provides a clutch device, which can prevent the device from overload rotation and prolong the service life.

The disclosure further provides an induction bin having the clutch device mentioned above.

In a first aspect, embodiments of the disclosure provide a clutch device, including a transmission assembly and a reset assembly, where the transmission assembly includes a first connector and a second connector, the first connector is connected to the second connector, the first connector is provided with a bump on a side of the first connector close to the second connector, the second connector is provided with a groove on a side of the second connector close to the first connector, and the second connector is movable in an axial direction so that the bump is capable of being clamped in or slid out of the groove; and the reset assembly includes an elastic element, which is configured to drive the second connector to move towards the first connector.

The clutch device according to the embodiments of the disclosure has at least the beneficial effects as follows. The first connector is connected to the second connector, the second connector is driven by the elastic element to move towards the first connector in the axial direction, so that the bump can be clamped into the groove. In the process of driving the first connector to rotate, when the torque input to the first connector is less than the maximum working torque of the clutch device, the elastic element drives the second connector to abut against the first connector, so that the bump can be stabilized in the groove, and the first connector can drive the second connector to rotate, thereby realizing the transmission of torque. When the torque input to the first connector or the second connector is greater than the maximum working torque of the clutch device, the second connector can compress the elastic element, so that the second connector can move away from the first connector in the axial direction, the bump can slide out of the groove to make the first connector separated from the second connector, realizing no-load rotation of the first connector or the second connector, and avoiding the overload rotation of the clutch device to prevent overload damage, and prolong the service life.

In some embodiments, the groove is provided in plural, and the plurality of grooves are evenly formed at intervals along a circumferential direction of the second connector.

In some embodiments, the number of the bumps is equal to the number of the grooves.

In some embodiments, the bump is of a hemispherical shape.

In some embodiments, the first connector is provided with a turntable portion and a rotating shaft portion, the turntable portion is connected to the rotating shaft portion, the bump is disposed on the turntable portion, the second connector is arranged around the rotating shaft portion, a clamping slot is formed in the rotating shaft portion at an end away from the turntable portion, the clamping slot is connected with a clamping block, one end of the elastic element abuts against the clamping block, and the other end of the clamping block abuts against the second connector.

In some embodiments, the reset assembly further includes a connecting piece, which is arranged around the rotating shaft portion, and both sides of the connecting piece abut against the elastic element and the clamping block respectively.

In some embodiments, the transmission assembly further includes a connecting cylinder, the connecting cylinder includes a guide strip protruding from an inner wall of the connecting cylinder, the second connector and the first connector are sequentially arranged in the connecting cylinder, the second connector includes a chute in an outer wall of the second connector, the guide strip is capable of sliding in the chute, one end of the elastic element abuts against a bottom wall of the connecting cylinder, and the other end of the elastic element abuts against the second connector.

In some embodiments, the reset assembly further includes a limit block, which is in threaded connection with the connecting cylinder and abuts against the first connector.

In some embodiments, the limit block includes a plurality of handle portions protruding from an outer wall of the limit block, and the plurality of handle portions are arranged at intervals along a circumferential direction of the limit block.

In a second aspect, embodiments of the disclosure provide an induction bin, including the clutch device according to the embodiments in the first aspect of the disclosure. By providing the clutch device according to the embodiments in the first aspect of the disclosure on the induction bin, an overload rotation of the lid of the induction bin can be avoided, the risk of damage to the induction bin can be reduced, and the service life can be prolonged.

Additional aspects and advantages of the disclosure will be set forth in part in the following description, and part will become apparent from the following description, or learned by practice of the disclosure.

BRIEF DESCRIPTION OF DRAWINGS

The above-mentioned and/or additional aspects and advantages of the disclosure will become apparent and readily understood from the description of the embodiments taken in conjunction with the following drawings, wherein.

REFERENCE NUMERAL LISTING

Figure 1:
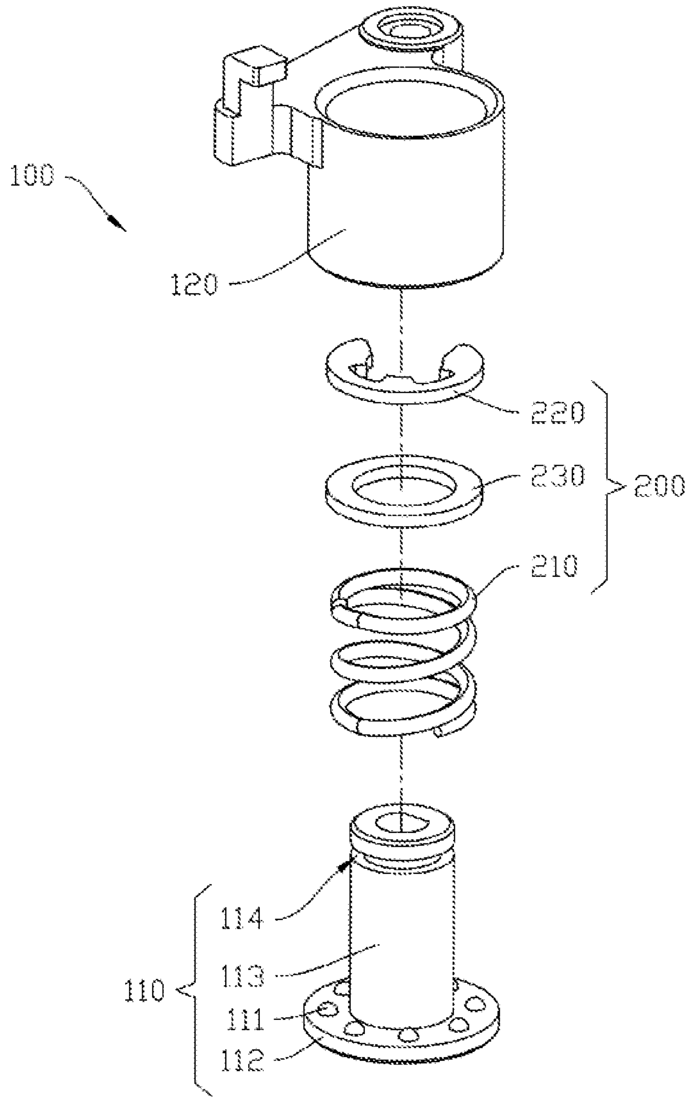
FIG. 1 is an exploded schematic diagram of a clutch device according to an embodiment in a first aspect of the disclosure.

Transmission Assembly 100, First Connector 110, Bump 111, Turntable Portion 112, Rotating Shaft Portion 113, Clamping Slot 114, Second Connector 120, Groove 121, Chute 122, Connecting Cylinder 130, and Guide Strip 131;

Reset Assembly 200, Elastic Element 210, Clamping Block 220, Connecting Piece 230, Limit Block 240, and Handle Portion 241;

Lid 310, and Induction Part 320.

DETAILED DESCRIPTION

Embodiments of the disclosure will be described in detail below. Examples of the embodiments are illustrated in the accompanying drawings, where the same or like reference numerals throughout the figures indicate the same or like elements having the same or like functions. The embodiments described below with reference to the accompanying drawings are exemplary and are intended only to explain the disclosure instead of being construed as limiting the disclosure.

In the description of the disclosure, it should be understood that, descriptions relating to orientation, for example, orientation or positional relationships indicated by “up”, “down”, “front”, “back”, “left”, “right”, etc. are based on the orientation or positional relationships shown in the accompanying drawings, and are to facilitate the description of the disclosure and simplify the description only, rather than indicating or implying that the device or element referred to must have a specific orientation or be constructed and operated in a specific orientation, and therefore cannot be construed as limiting the disclosure.

In the description of the disclosure, the meaning of “several” is one or more, the meaning of “a plurality of” is two or more, “greater than”, “less than”, “more than”, etc. are to be understood to exclude the given figure, and “above”, “below”, “within”, etc. are understood to include the given figure. If “first” and “second”, etc. are referred to, it is only for the purpose of distinguishing technical features, and shall not be understood as indicating or implying relative importance or implying the number of the indicated technical features or implying the sequence of the indicated technical features.

In the description of the disclosure, unless otherwise explicitly defined, the words such as “set”, “install”, and “connect” should be understood in a broad sense, and those skilled in the art can determine the specific meanings of the above words in the disclosure in a rational way in combination with the specific contents of the technical solutions.

Figure 2:
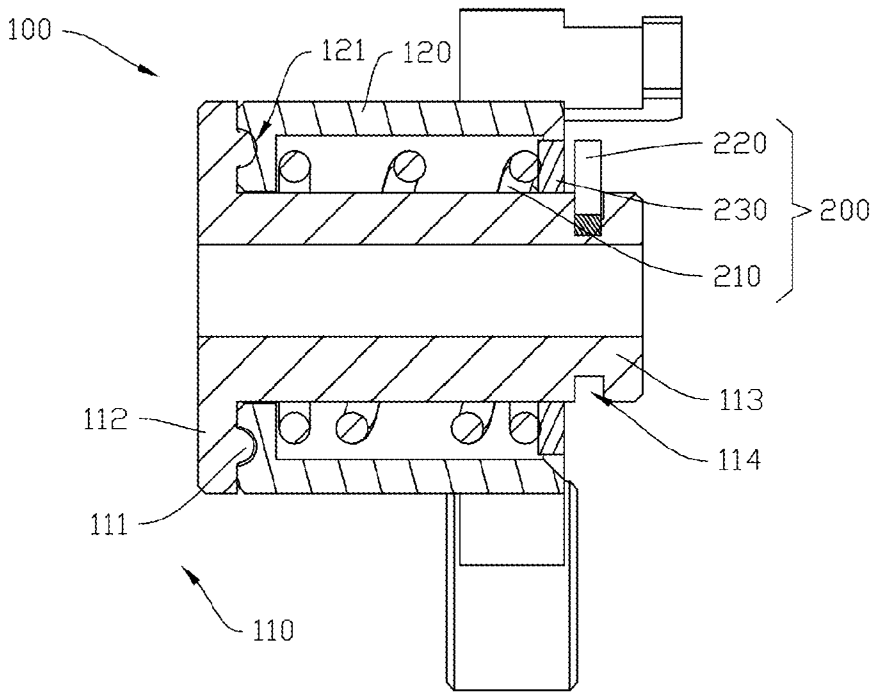
FIG. 2 is a cross-sectional view of the clutch device according to an embodiment in the first aspect of the disclosure.

It can be understood that, referring to FIG. 1 and FIG. 2, a clutch device in a first aspect of the disclosure includes a transmission assembly 100 and a reset assembly 200, where the transmission assembly 100 includes a first connector 110 and a second connector 120, the first connector 110 is connected to the second connector 120, the first connector 110 is provided with a bump 111 on a side of the first connector 110 close to the second connector 120, the second connector 120 is provided with a groove 121 on a side of the second connector 120 close to the first connector 110, and the second connector 120 is movable in an axial direction so that the bump 111 can be clamped in or slid out of the groove 121; and the reset assembly 200 includes an elastic element 210, which is configured to drive the second connector 120 to move towards the first connector 110.

The first connector 110 is connected to the second connector 120; the second connector 120 is driven by the elastic element 210 to move towards the first connector 110 to enable the second connector 120 to move in the axial direction and enable the second connector 120 to abut against the first connector 110, so that the bump 111 can be clamped into the groove 121. In the process of driving the first connector 110 to rotate, when the torque input to the first connector 110 is less than the maximum working torque of the clutch device, the elastic element 210 can drive the second connector 120 to be tightly pressed on the first connector 110, so that the bump 111 can be stabilized in the groove 121 to enable the first connector 110 to transmit torque to the groove 121 via the bump 111, and enable the first connector 110 to drive the second connector 120 to rotate, thereby realizing the transmission of torque; and when the torque input to the first connector 110 or the second connector 120 is greater than the maximum working torque of the clutch device, the first connector 110 can drive the second connector 120 via the bump 111 to perform an axial movement in a direction away from the first connector 110, and the second connector 120 compresses the elastic element 210, so that the bump 111 can slide out of the groove 121 to make the first connector 110 separated from the second connector 120, realizing no-load rotation of the first connector 110 or the second connector 120, and avoiding overload rotation of the clutch device to prevent the overload damage and prolong the service life.

It should be noted that the first connector 110 can be connected to a driving part such as a motor, a rotary cylinder or a hydraulic motor, and the second connector 120 can be connected to a lid 310 of an induction bin. By clamping or sliding the bump into or out of the groove 121, the overload rotation of the driving part can be prevented, and the service life of the driving part can be prolonged.

The maximum working torque of the clutch device can be set according to the elastic force of the elastic element 210. The greater the elastic force of the elastic element 210, the greater the force of the second connector 120 pressed on the first connector 110, and the greater the maximum working torque of the clutch device; and the smaller the elastic force of the elastic element 210, the smaller the force of the second connector 120 pressed on the first connector 110, and the smaller the maximum working torque of the clutch device.

In addition, the elastic element 210 can be an ordinary compression spring, or an elastic element such as a rubber pad.

It can be understood that, referring to FIG. 1 and FIG. 2, a plurality of grooves 121 are formed and are evenly formed at intervals along a circumferential direction of the second connector 120. By forming the plurality of grooves 121, when the first connector 110 rotates, the elastic element 210 can drive the second connector 120 to approach the first connector 110, so that the bumps 111 can be quickly clamped into the grooves 121, which reduces the idle time of the first connector 110, accelerates the connection between the first connector 110 and the second connector 120, and improves the performance of the clutch device.

In addition, the plurality of grooves 121 are evenly formed along a circumferential direction of the second connector 120, so that the mass of the second connector 120 is evenly distributed, the shaking caused when the second connector 120 rotates is reduced, and the movement stability of the second connector 120 is improved.

Specifically, referring to FIG. 1 and FIG. 2, the number of the bumps 111 is equal to the number of the grooves 121. By providing a plurality of bumps 111 with the number equal to that of the grooves 121, the mass of the first connector 110 is evenly distributed, and the shaking caused when the first connector 110 rotates is reduced, so that the first connector 110 can move stably. In addition, by providing a plurality of bumps 111, the force between a single bump 111 and a groove 121 can be reduced, the bearing capacity of the first connector 110 and the second connector 120 can be improved, and the overload failure of the bumps 111 and the grooves 121 can be prevented, thereby reducing the wear of the bumps 111, and prolonging the service life of the bumps 111 and the grooves 121.

In addition, by setting that the number of the bumps 111 is equal to the number of the grooves 121, one bump 111 can correspond to one groove 121, the plurality of bumps 111 can enter the plurality of grooves 121 respectively, and the bumps 111 and the grooves 121 can be worn evenly, so that the service life of the first connector 110 and the second connector 120 can be prolonged, and the reliability of the clutch device can be improved.

It can be understood that, referring to FIG. 1 and FIG. 2, the bumps 111 are of hemispherical shapes. By setting the shape of the bumps 111 to be hemispherical, the contact area between the bumps 111 and the grooves 121 can be expanded, so that the friction between the bumps 111 and the grooves 121 can be increased, and the bumps 111 and the grooves 121 can be stably connected. In addition, by setting the shape of the bumps 111 to be hemispherical, the surfaces of the bumps 111 are round and smooth, so that when the bumps 111 are clamped or slide into the grooves 121, the contact area between the bumps 111 and the grooves 121 can be reduced, the wear of the bumps 111 and the grooves 121 can be reduced, stress concentration can be avoided, and the service life of the first connector 110 and the second connector 120 can be prolonged. The grooves 121 may be of hemispherical shapes.

It can be understood that, referring to FIG. 1 and FIG. 2, the first connector 110 is provided with a turntable portion 112 and a rotating shaft portion 113, the turntable portion 112 is connected to the rotating shaft portion 113, the bumps 111 are disposed on the turntable portion 112, the second connector 120 is arranged around the rotating shaft portion 113, a clamping slot 114 is formed in the rotating shaft portion 113 at an end away from the turntable portion 112, the clamping slot 114 is connected with a clamping block 220, one end of the elastic element 210 abuts against the clamping block 220, and the other end of the clamping block 220 abuts against the second connector 120. The second connector 120 is arranged around the rotating shaft portion 113, the clamping block 220 is disposed in the clamping slot 114, one end of the elastic element 210 abuts against the clamping block 220, and the other end abuts against the second connector 120, so that the second connector 120 can be driven by the elastic element 210 to move in the axial direction of the rotating shaft portion 113, so as to enable the bumps 111 to be clamped into or to slide out of the grooves 121. By providing the rotating shaft portion 113, the second connector 120 can be positioned on the first connector 110, so that the second connector 120 can slide smoothly on the first connector 110.

Specifically, referring to FIG. 1 and FIG. 2, the reset assembly 200 further includes a connecting piece 230, which is arranged around the rotating shaft portion 113, and both sides of the connecting piece 230 abut against the elastic element 210 and the clamping block 220 respectively. One end of the connecting piece 230 abuts against the elastic element 210, the other end abuts against the clamping block 220, and the connecting piece 230 is arranged around the rotating shaft portion 113, so that the connecting piece 230 can slide in the axial direction of the rotating shaft portion 113. The elastic element 210 drives the connecting piece 230 to move towards the clamping block 220, so that the connecting piece 230 abuts against the clamping block 220, thereby making the clamping block 220 uniformly stressed, preventing the clamping block 220 from falling off from the clamping slot 114, and improving the position stability of the clamping block 220.

It can be understood that, referring to FIG. 3 to FIG. 6, the transmission assembly 100 further includes a connecting cylinder 130, which includes a guide strip 131 protruding from an inner wall of the connecting cylinder 130, the second connector 120 and the first connector 110 are sequentially arranged in the connecting cylinder 130, the second connector 120 includes a chute 122 formed in an outer wall of the second connector 120, the guide strip 131 can slide in the chute 122, one end of the elastic element 210 abuts against a bottom wall of the connecting cylinder 120, and the other end of the elastic element 210 abuts against the second connector 120. By forming the guide strip 131 on the inner wall of the connecting cylinder 130, the second connector 120 can slide in the axial direction of the connecting cylinder 130 through the chute 122, therefore, the positioning accuracy of the second connector 120 can be improved, and the second connector 120 can slide smoothly in the axial direction of the connecting cylinder 130, facilitating the clamping or sliding of the bumps 111 into or out of the grooves 121.

When the torque input to the first connector 110 is smaller than the maximum working torque of the clutch device, the second connector 120 is driven by the elastic element 210 to move towards the first connector 110, so that the bumps 111 can be clamped into the grooves 121, the first connector 110 can drive the second connector 120 to rotate, and the second connector 120 can be clamped in the guide block through the chute 122 to make the guide strip 131 abut against the side wall of the chute 122, thereby driving the connecting cylinder 130 to rotate.

When the torque input to the first connector 110 or the second connector 120 is greater than the maximum working torque of the clutch device, the bumps 111 are separated from the grooves 121, and the second connector 120 slides in the length direction of the guide strip 131, so that the second connector 120 slides in the axial direction of the connecting cylinder 130 away from the first connector 110, the second connector 120 compresses the elastic element 210, and the first connector 110 is separated from the second connector 120, thereby achieving no-load rotation of the first connector 110 or the second connector 120, avoiding overload rotation of the clutch device, and improving the structural stability of the clutch device.

In addition, by making the guide strip 131 clamped in the chute 122, a rotation gap between the connecting cylinder 130 and the second connector 120 can be reduced, a synchronous rotation of the second connector 120 and the connecting cylinder 130 can be realized, and the transmission accuracy of the clutch device can be improved. Specifically, referring to FIG. 5, the reset assembly 200 further includes a limit block 240, which is in threaded connection with the connecting cylinder 130 and abuts against the first connector 110. The limit block 240 is in threaded connection with the connecting cylinder 130 to drive the limit block 240 to rotate, which enables the limit block 240 to be quickly mounted on the connecting cylinder 130, so that the first connector 110 can be quickly positioned on the limit block 240, thereby reducing the assembly time of the clutch device and improving the processing efficiency of the clutch device.

Figure 3:
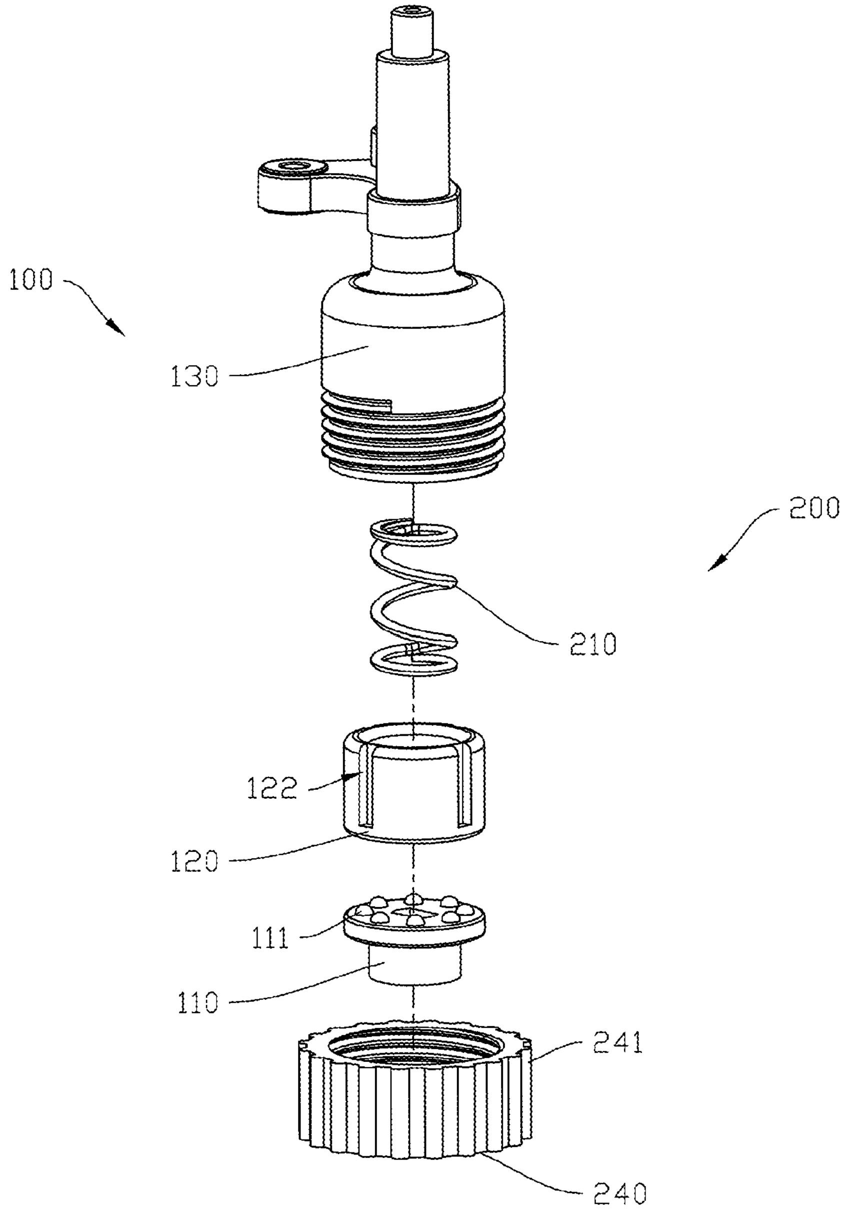
FIG. 3 is an exploded schematic diagram of the clutch device according to another embodiment in the first aspect of the disclosure.
Figure 4:
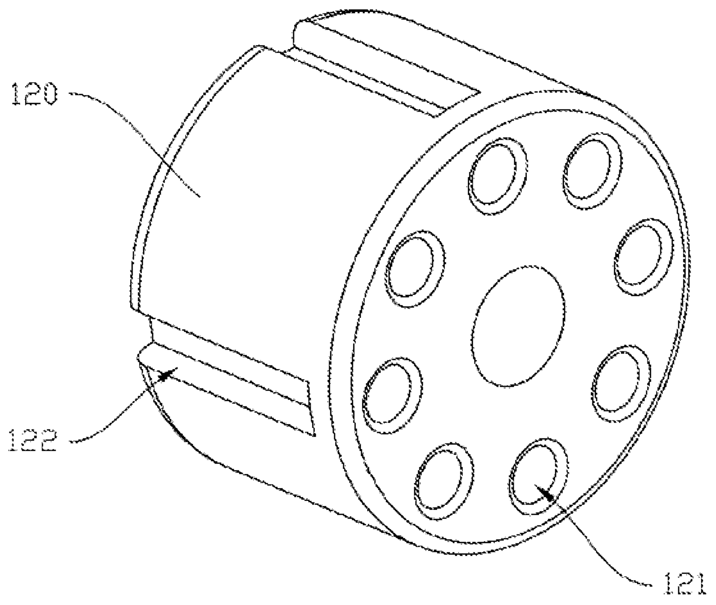
FIG. 4 is a schematic diagram of a second connector of the clutch device according to another embodiment in the first aspect of the disclosure.
Figure 5:
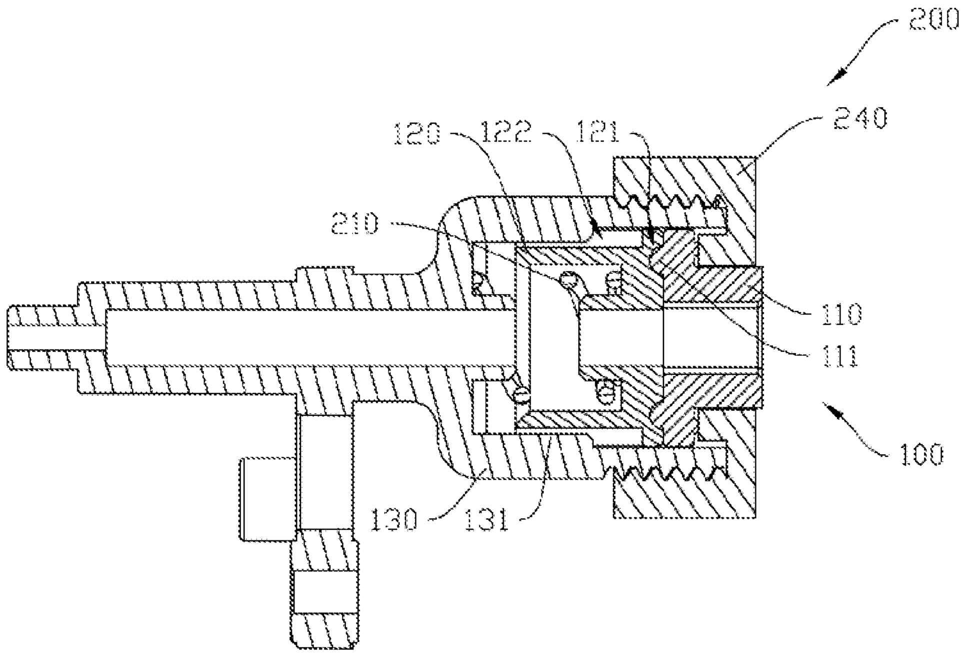
FIG. 5 is a cross-sectional view of the clutch device according to another embodiment in the first aspect of the disclosure.
Figure 6:
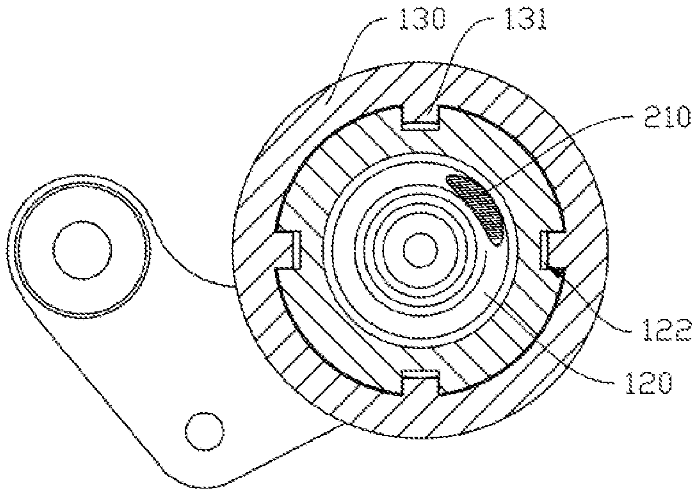
FIG. 6 is another cross-sectional view of the clutch device according to another embodiment in the first aspect of the disclosure.

Specifically, referring to FIG. 3, the limit block 240 includes a plurality of handle portions 241 protruding from an outer wall of the limit block 240, the plurality of handle portions 241 are arranged at intervals along a circumferential direction of the limit block 240. By providing the plurality of handle portions 241 protruding from the outer wall of the limit block 240, it is convenient for a user to grasp the limit block 240 to drive the limit block 240 to rotate, accelerating the assembly of the clutch device, shortening the assembly time of the clutch device, and reducing the production cost.

Figure 7:
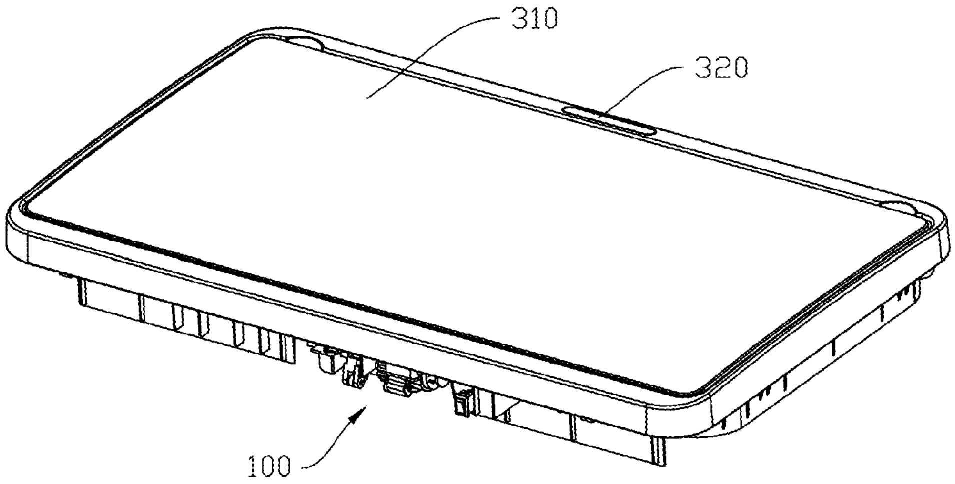
FIG. 7 is a schematic diagram of an induction bin according to an embodiment in a second aspect of the disclosure.

It can be understood that, referring to FIG. 7, an induction bin in a second aspect of the disclosure includes the clutch device in the first aspect of the disclosure. As having all the technical features of the clutch device according to the embodiments in the first aspect of the disclosure, the induction bin also has the beneficial effects of all the above-mentioned embodiments, which will not be repeated herein.

It can be understood that, referring to FIG. 1 and FIG. 7, the induction bin includes a lid 310 and a body (not shown in the drawings), a driving part and an induction part 320, where the lid 310 is hinged with the body, the induction part 320 is electrically connected to the driving part, the driving part is connected to the clutch device, and the induction part 320 is used for sensing the movement of a user. The driving part drives the first connector 110 to rotate, and then the first connector 110 drives the second connector 120 to rotate, and the second connector 120 drives the lid 310 to rotate on the body, so that the automatic opening or closing of the induction bin is realized. By providing the clutch device according to the embodiments in the first aspect of the disclosure, the lid 310 can be connected to or separated from the driving part, the overload rotation of the driving part can be avoided when the lid 310 is blocked, and the overload damage of the driving part can be prevented, and the lid 310 can be prevented from driving the driving part to rotate when being forced to open or close, thereby prolonging the service life of the induction bin. The induction part 320 can be a photoelectric sensor or an ultrasonic sensor.

The embodiments of the disclosure have been described in detail above in conjunction with the accompanying drawings, but the disclosure is not limited to the above-mentioned embodiments. Within the scope of knowledge of those of ordinary skill in the art, various changes can also be made without departing from the purpose of the disclosure.

What is claimed is:

1. A clutch device, comprising:

a transmission assembly, wherein the transmission assembly comprises a first connector and a second connector, the first connector is connected to the second connector, the first connector is provided with a bump on a side of the first connector close to the second connector, the second connector is provided with a groove on a side of the second connector close to the first connector, and the second connector is movable in an axial direction so that the bump is capable of being clamped in or slid out of the groove; and a reset assembly, wherein the reset assembly comprises an elastic element, which is configured to drive the second connector to move towards the first connector;

wherein the bump is of a hemispherical shape.

2. The clutch device according to claim 1, wherein the groove is provided in plural, and the plurality of grooves are evenly formed at intervals along a circumferential direction of the second connector.

3. The clutch device according to claim 2, wherein the number of the bumps is equal to the number of the grooves.

4. The clutch device according claim 1, wherein the first connector is provided with a turntable portion and a rotating shaft portion, the turntable portion is connected to the rotating shaft portion, the bump is disposed on the turntable portion, the second connector is arranged around the rotating shaft portion, a clamping slot is formed in the rotating shaft portion at an end away from the turntable portion, the clamping slot is connected with a clamping block, one end of the elastic element abuts against the clamping block, and the other end of the clamping block abuts against the second connector.

5. The clutch device according to claim 4, wherein the reset assembly further comprises a connecting piece, which is arranged around the rotating shaft portion, and both sides of the connecting piece abut against the elastic element and the clamping block respectively.

6. The clutch device according to claim 1, wherein the transmission assembly further comprises a connecting cylinder, the connecting cylinder comprises a guide strip protruding from an inner wall of the connecting cylinder, the second connector and the first connector are sequentially arranged in the connecting cylinder, the second connector comprises a chute in an outer wall of the second connector, the guide strip is capable of sliding in the chute, one end of the elastic element abuts against a bottom wall of the connecting cylinder, and the other end of the elastic element abuts against the second connector.

7. The clutch device according to claim 6, wherein the reset assembly further comprises a limit block, which is in threaded connection with the connecting cylinder and abuts against the first connector.

8. The clutch device according to claim 7, wherein the limit block comprises a plurality of handle portions protruding from an outer wall of the limit block, and the plurality of handle portions are arranged at intervals along a circumferential direction of the limit block.

9. An induction bin, comprising a clutch device comprising:

a transmission assembly, wherein the transmission assembly comprises a first connector and a second connector, the first connector is connected to the second connector, the first connector is provided with a bump on a side of the first connector close to the second connector, the second connector is provided with a groove on a side of the second connector close to the first connector, and the second connector is movable in an axial direction so that the bump is capable of being clamped in or slid out of the groove; and a reset assembly, wherein the reset assembly comprises an elastic element, which is configured to drive the second connector to move towards the first connector;

wherein the bump is of a hemispherical shape.

10. The induction bin according to claim 9, wherein the groove is provided in plural, and the plurality of grooves are evenly formed at intervals along a circumferential direction of the second connector.

11. The induction bin according to claim 10, wherein the number of the bumps is equal to the number of the grooves.

12. The induction bin according claim 9, wherein the first connector is provided with a turntable portion and a rotating shaft portion, the turntable portion is connected to the rotating shaft portion, the bump is disposed on the turntable portion, the second connector is arranged around the rotating shaft portion, a clamping slot is formed in the rotating shaft portion at an end away from the turntable portion, the clamping slot is connected with a clamping block, one end of the elastic element abuts against the clamping block, and the other end of the clamping block abuts against the second connector.

13. The induction bin according to claim 12, wherein the reset assembly further comprises a connecting piece, which is arranged around the rotating shaft portion, and both sides of the connecting piece abut against the elastic element and the clamping block respectively.

14. The induction bin according to claim 9, wherein the transmission assembly further comprises a connecting cylinder, the connecting cylinder comprises a guide strip protruding from an inner wall of the connecting cylinder, the second connector and the first connector are sequentially arranged in the connecting cylinder, the second connector comprises a chute in an outer wall of the second connector, the guide strip is capable of sliding in the chute, one end of the elastic element abuts against a bottom wall of the connecting cylinder, and the other end of the elastic element abuts against the second connector.

15. The induction bin according to claim 14, wherein the reset assembly further comprises a limit block, which is in threaded connection with the connecting cylinder and abuts against the first connector.

16. The induction bin according to claim 15, wherein the limit block comprises a plurality of handle portions protruding from an outer wall of the limit block, and the plurality of handle portions are arranged at intervals along a circumferential direction of the limit block.

* * * * *